United States Patent [19]

Lannoch

[11] 3,754,651
[45] Aug. 28, 1973

[54] FILTER
[76] Inventor: Rudolf Lannoch, Teplitzer Str. 38, Berlin, Germany
[22] Filed: Mar. 19, 1971
[21] Appl. No.: 125,975

[30] Foreign Application Priority Data
Mar. 26, 1970 Germany................... P 20 16 001.4

[52] U.S. Cl.................................. 210/106, 210/356
[51] Int. Cl............................................. B01d 39/02
[58] Field of Search............ 210/106, 121, 350–352, 210/354

[56] References Cited
UNITED STATES PATENTS
2,429,417  10/1947  Magill.............................. 210/356 X
2,460,084  1/1949   Hebo................................. 210/356
3,542,195  11/1970  Soriente.......................... 210/121 X FOREIGN PATENTS OR APPLICATIONS
638,948  6/1928  France................................ 210/356
467,511  10/1928  Germany............................ 210/356

Primary Examiner—John Adee
Attorney—Allison C. Collard

[57] ABSTRACT

A fluid filter consisting of a helical or spirally wound wire element, a fluid guide pipe disposed within the center of the element and containing a piston-like member responsive to the pressure of the fluid connected to one end of the helical element. When the fluid is pumped, the pressure forces the piston-like member up within the fluid guide pipe, and the helical filter winding is contracted so as to provide effective filtering of dirt and other foreign particles. When no fluid is being pumped and no pressure exists, the piston-like member forces the helical winding into an extended position so as to cause the collected dirt and residue to be cleaned from the winding.

7 Claims, 4 Drawing Figures

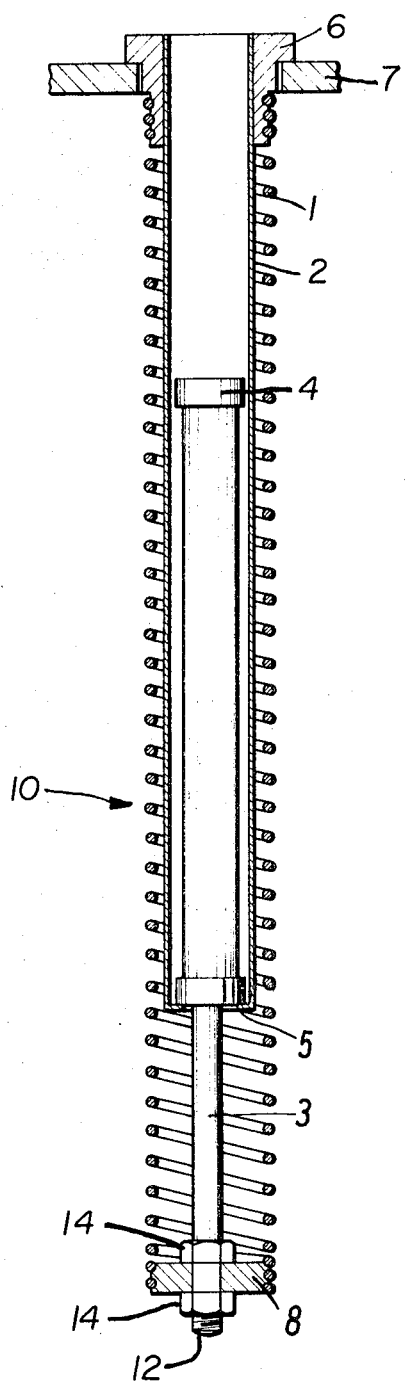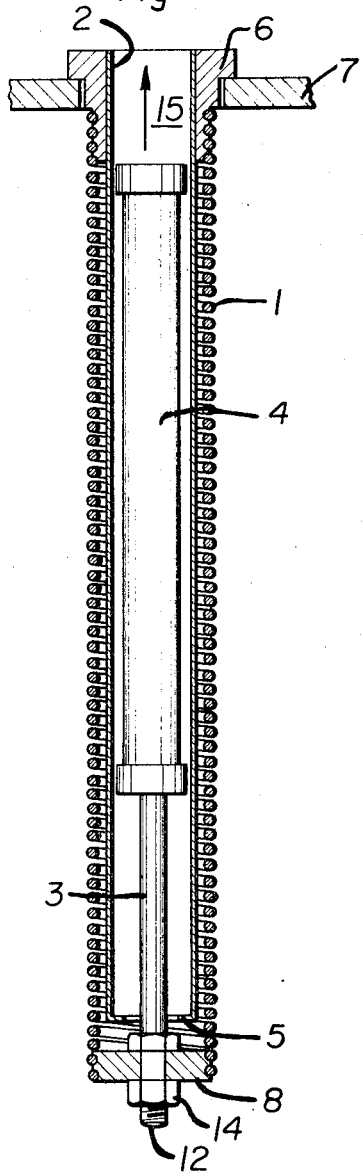

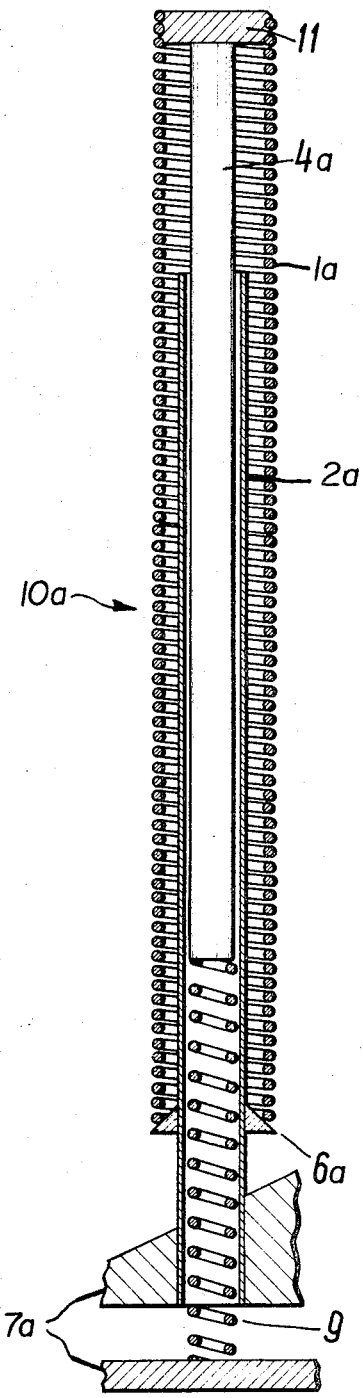
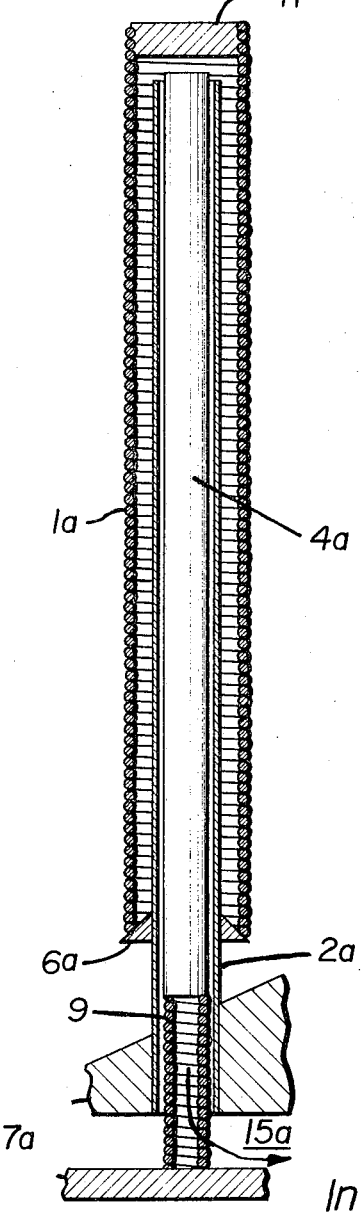

3,754,651

FILTER

The present invention relates to fluid filters, and in particular, to fluid filters having spirally wound or helical filter elements.

In the prior art, in order to automatically clean a helical filter element and remove collected dirt and residue, a plate or disc was provided which was attached to one end of the helical filter element, connected by means of a return torsion spring to a stationary part of the filter housing. In order to clean the filter element, the same was stretched by means of the movement of the plate or disc. The return spring would pull the filter element back into its filtering position when the plate was released.

This type of construction was bulky, cumbersome and expensive. If manual operation was required, a large amount of manual force was needed to operate the filter element in order to clean it. Very often, the operator forgot to operate the device, and the dirt and residue collected by the filter remained unremoved. In automatic operation, a compressed air device is required and the plate is moved by a compressed air cylinder and air valve. This mechanism is also complicated and involves numerous parts and devices.

Accordingly, the present invention obviates the above-mentioned disadvantages of previous mechanisms by providing a spirally wound or helical filter element, secured at one end to a stopper plug, which is secured in the fluid output duct of the pump. A fluid guide pipe is disposed through the stopper plug and extends axially down through the center of the helical filter element. The opposite end of the latter is coupled by means of a disc and a rod to a movable piston-like member disposed within the guide pipe. The piston moves vertically upward in response to fluid pressure in the pump so as to hold the filter element in the contracted filtering position, and which moves vertically downward as a result of the weight of the piston so as to stretch or extend the filter element when the pump is shut off. This action clears the filter element of collected dirt and residue automatically.

It is therefore an object according to the present invention to provide a fluid filter element which is automatically self-cleaning and which requires no manual or outside mechanical devices for operation.

It is another object according to the present invention to provide a fluid filter which is simple in design, easy to manufacture, and efficient and reliable in operation.

Other objects and features of the present invention will become apparent from the following detailed description considered in connection with the accompanying drawings which disclose exemplary embodiments of the invention. It is to be understood, however, that the drawings are designed for the purpose of illustration only and not as a definition of the limits of the invention.

In the drawings, wherein similar reference characters denote similar elements throughout the several views:

FIG. 1 is a cross-sectional view of a filter element constructed in accordance with the invention showing the filter in its extended or cleaning position;

FIG. 2 is a cross-sectional view of a filter element of the invention showing the same in its contracted or filtering position; and, FIGS. 3 and 4 illustrate a second embodiment of the present invention, showing the filter element in its extended or cleaning position and contracted or filtering position respectively.

Referring to FIGS. 1 and 2, there is shown a fluid filter 10 which is rigidly mounted on the housing or other appropriate structural member 7 of a fluid pump (not shown). The filter includes a spirally-wound or helical filter element 1 which is rigidly secured, by welding or other appropriate methods, to a stop plug 6 which is secured in a recess provided in the fluid pump housing 7. A fluid guide pipe 2, open at both ends, is disposed within the center of stop plug 6 and extends axially through the entire length of the plug. The guide pipe serves as the fluid outlet of the pump.

A piston 4 is disposed within the guide pipe 2 and is connected by a rod 3 to a circular plate or disc 8 to which the end of the helical filter element 1 is affixed. Rod 3 is provided with a threaded end 12 upon which nuts 14 are engaged to secure the circular plate 8. Fluid guide pipe 2 is provided with an apertured flange 5 which abuts the lower surface of the piston 4 and limits its movement when the filter element 1 is in its fully extended position as shown in FIG. 1.

When the pump is actuated, the fluid flow out of guide pipe 2 forces piston 4 in the direction of the upward fluid flow shown by arrow 15 and causes helical element 1 to assume its contracted position as shown in FIG. 2. In this position, the fluid enters the filter between the sprial windings of the filter element, through the aperture provided in flange 5 at the lower end of the guide pipe 2 and up and out through the outlet opening thereof thereby filtering the fluid.

When the pump is shut off, the pressure exerted by the flowing fluid on piston 4 ceases and the weight of piston 4 and rod 3 will then move the piston and associated structure down through guide pipe 2 until the piston abuts flange 5 which limits the downward movement of the piston (see FIG. 1). In this extended position, any residue or dirt collected during filtering will then fall away and be removed from the filtering element.

Piston 4 should be fitted in guide pipe 2 with a clearance of approximately 1 mm. This clearance will be sufficient to create the appropriate pressure needed to raise the piston in the guide pipe and yet offer the least resistance to the flow of the fluid through the guide pipe and out of the outlet.

In certain cases where a sticky dirt residue is formed on the filter, it is advisable to activate and deactivate the pump in short intervals so as to cause the filter spiral to be oscillated back and forth between its contracted and extended positions in order to more efficiently remove the accumulated dirt.

in FIGS. 3 and 4 are shown a vertically mounted fluid filter 10a which includes a helical filter element 1a disposed over a guide pipe 2a which is rigidly affixed to the pump housing or other appropriate structure 7a. Guide pipe 2a is provided near its lower end with a tapered disc 6a which is rigidly affixed to the guide pipe and to which one end of the filter element 1a is secured.

At the opposite end of the filter element 1a, a circular disc 11 is rigidly secured to the helical element. A buoyant floating member 4a is disposed within the guide pipe 2a and is free for slidable movement therein. Member 4a may be of some appropriate buoyant material, or may merely be a hollow closed cylinder in which air is trapped.

In any case, when the pump is activated, the flow of the fluid creates a pressure on the disc 11 which will cause the helical filter element 1a to contract as illustrated in FIG. 4. The fluid will thus flow through the spirally wound element through guide pipe 2a and exit at the base of the guide pipe as indicated by arrow 15a.

When the pump is deactivated, the fluid remaining in the pump reservoir will cause the floating member 4a to rise as illustrated in FIG. 3 and abut disc 11, raising the same, so as to cause the helical filter element 1a to assume its extended position, as shown in FIG. 3.

The filter may also be provided with an additional spring 9 disposed within the filter pipe 2a beneath the floating member 4a in order to exert an additional force on the floating member 4a when the pump is deactivated so as to insure that the helical filter element is extended sufficiently. Similar to the previously described embodiment, the extended position causes any accumulated dirt and residue on the filter to fall away and thus provide automatically cleaning of the filter element.

While only a few embodiments of the invention have been shown and described, it will be obvious that many changes and modifications may be made thereunto without departing from the spirit and scope of the invention.

I claim:

1. A fluid pump filter, comprising: an elongated helical filter element for filtering the pump fluid; an elongated fluid guide pipe concentrically disposed within said filter element; mounting means rigidly secured at one end of said guide pipe for attaching thereto one end of said filter element; slidable piston means disposed within said guide pipe; means for coupling said piston means to the other end of said filter element; and flow-responsive means constituted by the cooperation of said filter element, said guide pipe and said piston means, by the intermediary of said mounting and said coupling means; thereby to provide (a) a contracted position for said filter element when the pump fluid is made to pass through said guide pipe, keeping said piston means in one end position; as well as (b) an extended position for said filter element when the filter is deactivated and no pump fluid is made to pass, said piston means being in a position spaced apart from said end position, in the same direction as said filter element; whereby residues are accumulated in said guide pipe in said contracted position of the filter element while they are discharged therefrom in said extended position thereof, upon operation of said flow-responsive means, as a result of the movement of said piston means from said end position to said spaced-apart positon.

2. The filter as defined in claim 1, wherein said piston member has a weight sufficient to move the same from said end position downward to said spaced-apart position when no pump fluid is made to pass that would keep the same in the upward end position; said piston means is shorter than said guide pipe, thereby allowing in said contracted position of the filter element for a residue collecting space at the bottom of said guide pipe; and wherein said mounting means includes a stop plug above said piston means in a structural member of the pump, for mounting said guide pipe to the outlet of the pump, while said coupling means is substantially below said piston means.

3. The filter as defined in claim 2, wherein said coupling means includes a circular planar member having a central aperture and the lower end of said filter element rigidly affixed thereto, a rod connected to the lower end of said piston means, and having at its remote end a threaded portion extending through said aperture of the planar member, and at least one fastening means threadably engaging said remote end of the rod for securing said planar member thereto in abutting relationship with said lower end of the filter element.

4. The filter as defined in claim 3, wherein said guide pipe has a flange at its lower end, opposite said stop plug, for limiting the downward movement of said piston means, and an aperture adjoining said flange, for discharging the residues from said guide tube in said extended position of the filter element when the lower end of said piston means abuts said flange of the guide pipe.

5. The filter as defined in claim 1, wherein said piston means is an elongated buoyant member which floats in the pump fluid within said guide pipe, sufficient to move said piston means from said end position upward to said spaced-apart position when no pump fluid is made to pass that would keep the same in the downward end position; one end of said guide pipe is rigidly secured to the outlet of the pump; and said mounting means includes a tapered disc secured to said guide pipe and having the lower end of said filter element attached thereto, both substantially below said piston means, while said coupling means is above said piston means.

6. The filter as defined in claim 5, wherein said coupling means includes a planar member having the upper end of said filter element rigidly affixed thereto, which is abutted and raised by said buoyant member when the filter is deactivated.

7. The filter as defined in claim 6, further comprising spring means disposed below said buoyant member and abutting a structural member of the pump, for providing additional upward force which assists in moving said buoyant member to said spaced-apart position.

* * * * *